United States Patent
Desquesne et al.

(10) Patent No.: US 10,065,538 B2
(45) Date of Patent: Sep. 4, 2018

(54) ARTICULATION MECHANISM AND VEHICLE SEAT HAVING SUCH A MECHANISM

(71) Applicant: Faurecia Sièges d'Automobile, Nanterre (FR)

(72) Inventors: Sylvain Desquesne, Conde sur Noireau (FR); Cédric Legras, La Lande Patry (FR); Sébastien Leconte, Flers (FR); Julien Talagas, Flers (FR)

(73) Assignee: Faurecia Sièges D'Automobile, Nanterre (FR)

( * ) Notice: Subject to any disclaimer, the term of this patent is extended or adjusted under 35 U.S.C. 154(b) by 22 days.

(21) Appl. No.: 14/897,228

(22) PCT Filed: May 19, 2014

(86) PCT No.: PCT/FR2014/051150
§ 371 (c)(1),
(2) Date: Apr. 4, 2016

(87) PCT Pub. No.: WO2014/199034
PCT Pub. Date: Dec. 18, 2014

(65) Prior Publication Data
US 2016/0200222 A1    Jul. 14, 2016

(30) Foreign Application Priority Data

Jun. 10, 2013  (FR) ...................................... 13 55342

(51) Int. Cl.
- *B60N 2/225* (2006.01)
- *B60N 2/235* (2006.01)
- *B60N 2/20* (2006.01)

(52) U.S. Cl.
CPC ............. *B60N 2/2362* (2015.04); *B60N 2/20* (2013.01); *B60N 2/2252* (2013.01); *B60N 2/2254* (2013.01)

(58) Field of Classification Search
CPC ... B60N 2/2254; B60N 2/2258; B60N 2/2255
See application file for complete search history.

(56) References Cited

U.S. PATENT DOCUMENTS

| 8,944,508 B2 | 2/2015 | Ohba et al. | |
| 2005/0110322 A1* | 5/2005 | Cha ...................... | B60N 2/2254 297/362 |
| 2008/0136242 A1* | 6/2008 | Stemmer .............. | B60N 2/2254 297/362 |
| 2008/0203784 A1* | 8/2008 | Eppert ................. | B60N 2/2254 297/216.1 |
| 2009/0309404 A1* | 12/2009 | Kirubaharan ........ | B60N 2/2252 297/367 P |
| 2010/0056317 A1* | 3/2010 | Kirubaharan ........ | B60N 2/2254 475/175 |

(Continued)

FOREIGN PATENT DOCUMENTS

| DE | 102010038797 A1 | 2/2012 |
| EP | 2586650 A2 | 1/2013 |
| FR | 2962945 A1 | 1/2012 |

OTHER PUBLICATIONS

International Search Report corresponding to international application No. PCT/FR2014/051150, dated Oct. 20, 2015, 3 pages.

*Primary Examiner* — Timothy J Brindley
(74) *Attorney, Agent, or Firm* — Reising Ethington P.C.

(57) ABSTRACT

An articulation mechanism comprising first and second frames mounted in a rotatable manner with respect to one another and connected together by a gear controlled by an input member (11) actuating an eccentric cam mounted in a rotatable manner in a cylindrical housing integral with the first frame. The cam is formed of two cam parts that are elastically urged towards a position of maximum eccentricity and are movable towards a position of minimum eccentricity during actuation of the input member. A load-spreading washer is mounted in a rotatable manner with play in the cylindrical housing, parallel to the eccentric cam.

17 Claims, 6 Drawing Sheets

(56) References Cited

U.S. PATENT DOCUMENTS

| | | | |
|---|---|---|---|
| 2011/0169312 A1* | 7/2011 | Desquesne | B60N 2/2254 297/362 |
| 2012/0001470 A1* | 1/2012 | Vogel | B60N 2/2252 297/362 |
| 2012/0001471 A1* | 1/2012 | Wei | B60N 2/2254 297/362 |
| 2012/0019041 A1* | 1/2012 | Leconte | B60N 2/2252 297/463.1 |
| 2012/0025586 A1 | 2/2012 | Legras et al. | |
| 2013/0106161 A1* | 5/2013 | Ohba | B60N 2/682 297/362 |
| 2013/0319144 A1* | 12/2013 | Kirubaharan | B60N 2/2252 74/89.16 |
| 2014/0001806 A1* | 1/2014 | Golarz | B60N 2/225 297/362 |
| 2014/0097659 A1* | 4/2014 | Wahls | B60N 2/6009 297/362 |
| 2014/0145491 A1* | 5/2014 | Stilleke | B21K 23/00 297/463.1 |
| 2014/0162827 A1* | 6/2014 | Wingensiefen | B60N 2/2254 475/177 |
| 2014/0225411 A1* | 8/2014 | Matt | B60N 2/682 297/362 |
| 2015/0298584 A1* | 10/2015 | Schuler | B60N 2/2254 297/361.1 |
| 2017/0015220 A1* | 1/2017 | Albert Reginold | B60N 2/682 |

\* cited by examiner

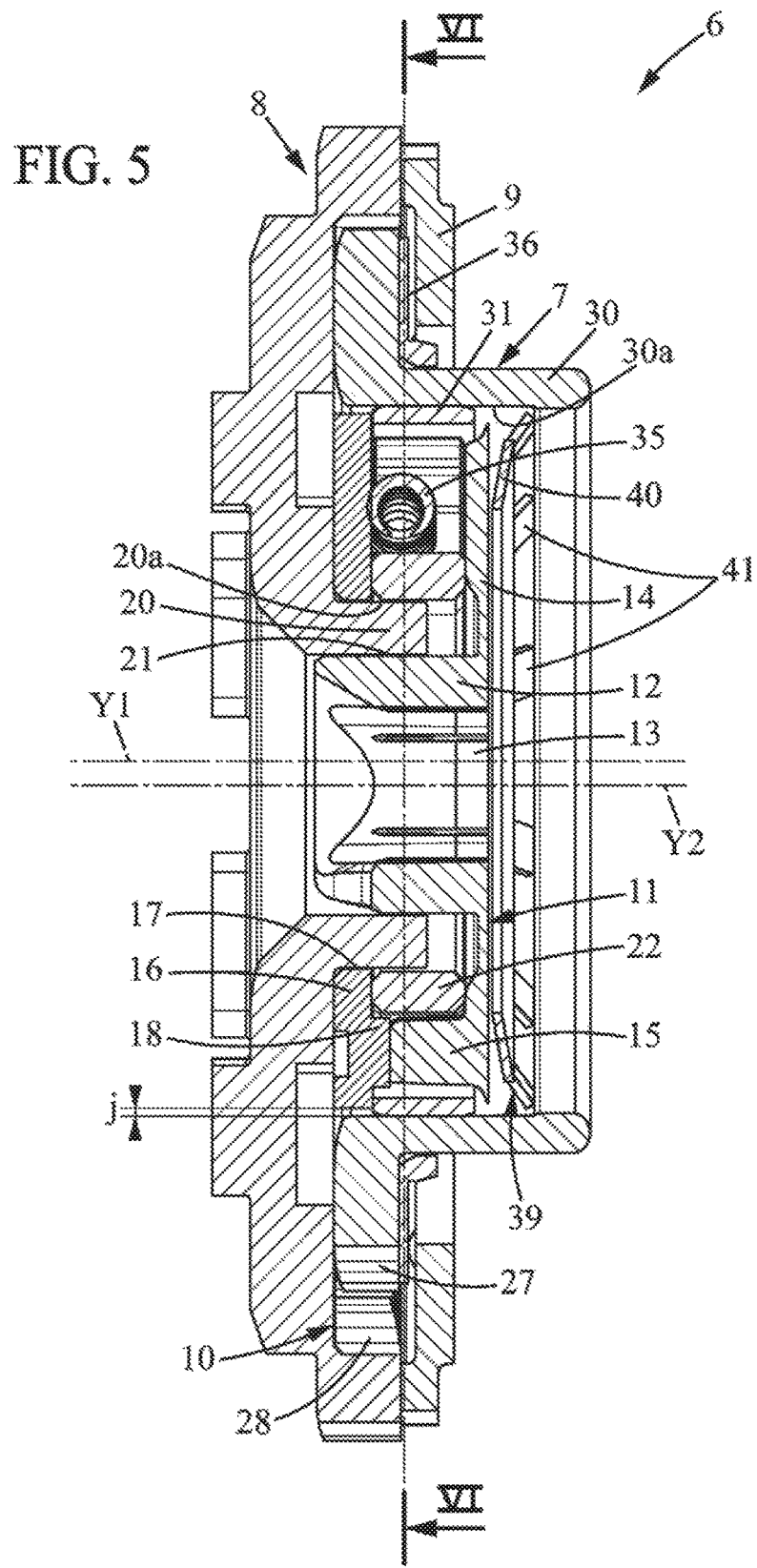

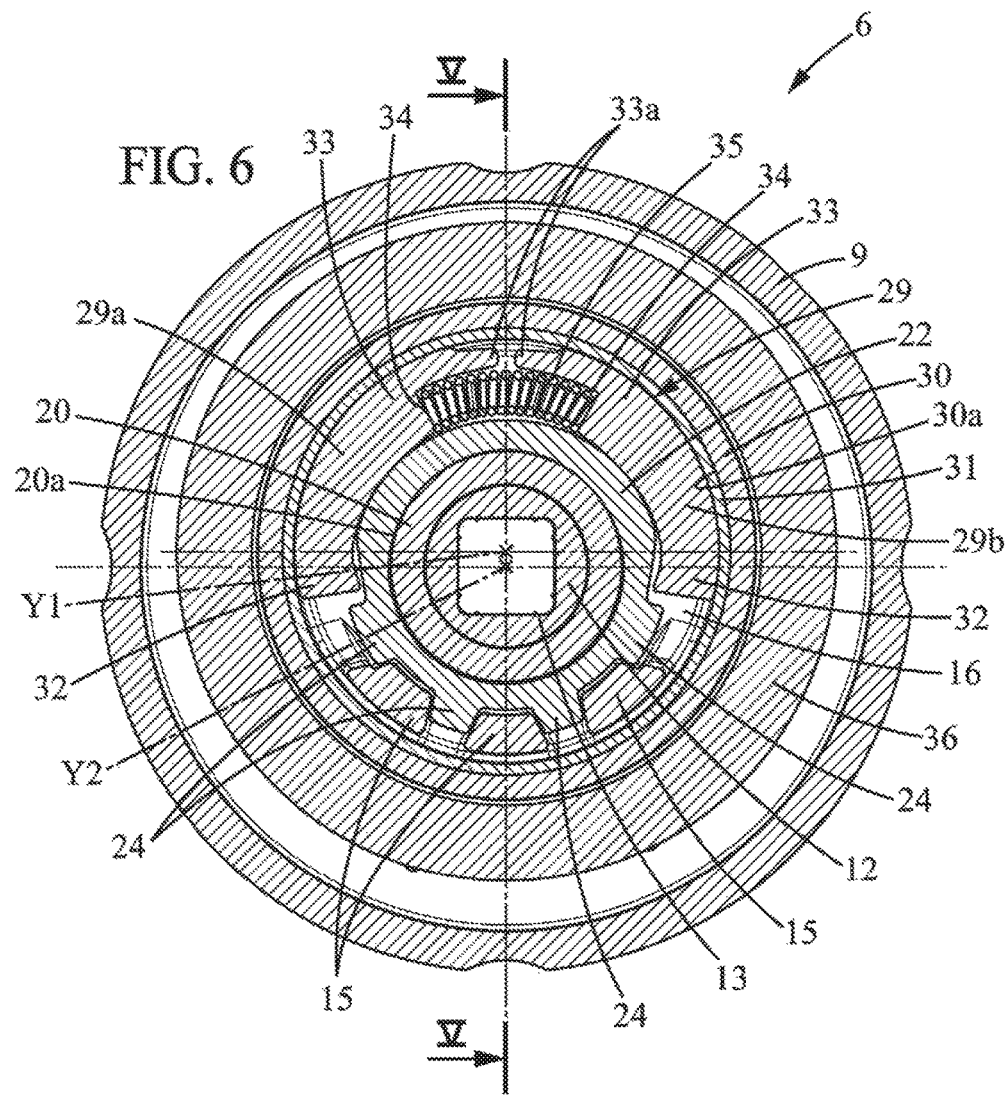

ARTICULATION MECHANISM AND VEHICLE SEAT HAVING SUCH A MECHANISM

FIELD OF THE INVENTION

The present invention relates to articulation mechanisms and to vehicle seats having such mechanisms.

More specifically, the invention relates to an articulation mechanism having:
  first and second frames mounted in a rotatable manner with respect to one another and connected together by a gear that has:
    a first circular toothing directed outwards, centered on a first axis and integral with the first frame,
    a second circular toothing directed inwards, centered on a second axis parallel to the first axis and offset in relation to said first axis, said second toothing presenting an inner diameter greater than the outer diameter of the first toothing,
  the first frame having a cylindrical housing of revolution centered on the first axis,
    a control device with an eccentric cam and radial play adjustment, mounted in a rotatable manner around the second axis in the cylindrical housing of the first frame.

BACKGROUND OF THE INVENTION

Document FR2962944 describes an example of an articulation mechanism of this type, which is completely satisfactory. However, it became desirable to further strengthen its durability in relation to the high torques which may result, particularly in the event of an accident.

OBJECTS OF THE INVENTION

Therefore the object of the present invention is, in particular, to improve the strength of these mechanisms.

For this purpose, an articulation mechanism of the type in question is characterized in that it also has a rigid load-spreading washer disposed radially in relation to the second axis, which is mounted in a rotatable manner on the second frame around the second axis and which is disposed in the cylindrical housing of the first frame with play, the outer periphery of the load-spreading washer being circular and centered on the first axis, and the load-spreading washer being rotated by the control device.

Thus, the load-spreading washer can accommodate part of the loads when the articulation mechanism is subject to high torques, and thus increase the durability of this mechanism.

In various embodiments of the articulation mechanism according to the invention, one may possibly also have recourse to one and/or the other of the following arrangements:
  the eccentric cam of the control device has first and second cam parts, mobile with respect to one another in rotation around the first axis between a position of minimum eccentricity and a position of maximum eccentricity designed to take up play between the first and second toothings, said cam parts being elastically urged with respect to one another towards said position of maximum eccentricity;
  the load-spreading washer is axially inserted between the eccentric cam and the second frame;
  the second frame has a cylindrical collar of revolution centered on the second axis, said collar extending at least partially inside the cylindrical housing, and the load-spreading washer journals on said collar of the second frame;
  the play is less than 1 mm when the first and second cam parts are in a position of maximum eccentricity;
  the play is sufficient so that the load-spreading washer does not interfere with the cylindrical housing of the first frame in normal operation, when the first and second cam parts are in a position of minimum eccentricity;
  the load-spreading washer is in steel;
  the load-spreading washer has a pin which projects towards the first frame which is engaged in a recess in the control device, such that the control device rotates the load-spreading washer;
  the articulation mechanism also has a locking ring fixed in the cylindrical housing of the first frame and retaining the control device and the load-spreading washer in said housing.

In addition, another object of the invention is a vehicle seat having first and second parts connected together by an articulation mechanism as defined above, the first and second frames being fixed, one to the first part and the other to the second part. The first and second seat parts can possibly be a back and a seat.

BRIEF DESCRIPTION OF THE DRAWINGS

Other characteristics and advantages of the invention will appear in the following description of one of its embodiments, given by way of non-limiting example, with reference to the attached drawings.

In the drawings:
FIG. 5 is an axial sectional view of the articulation mechanism of FIG. 2, the section being taken along line V-V of FIG. 6,
and
  FIG. 6 is a sectional view along line VI-VI of FIG. 5.

MORE DETAILED DESCRIPTION

In the various figures, the same references designate identical or similar elements.

Figure 1:
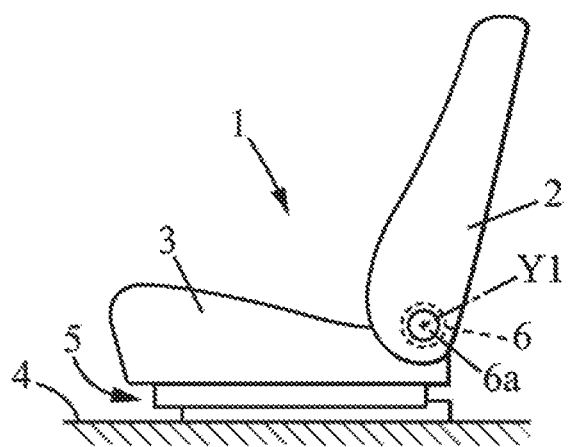
FIG. 1 is a schematic view of a vehicle seat equipped with an articulation mechanism according to the invention.
Figure 2:
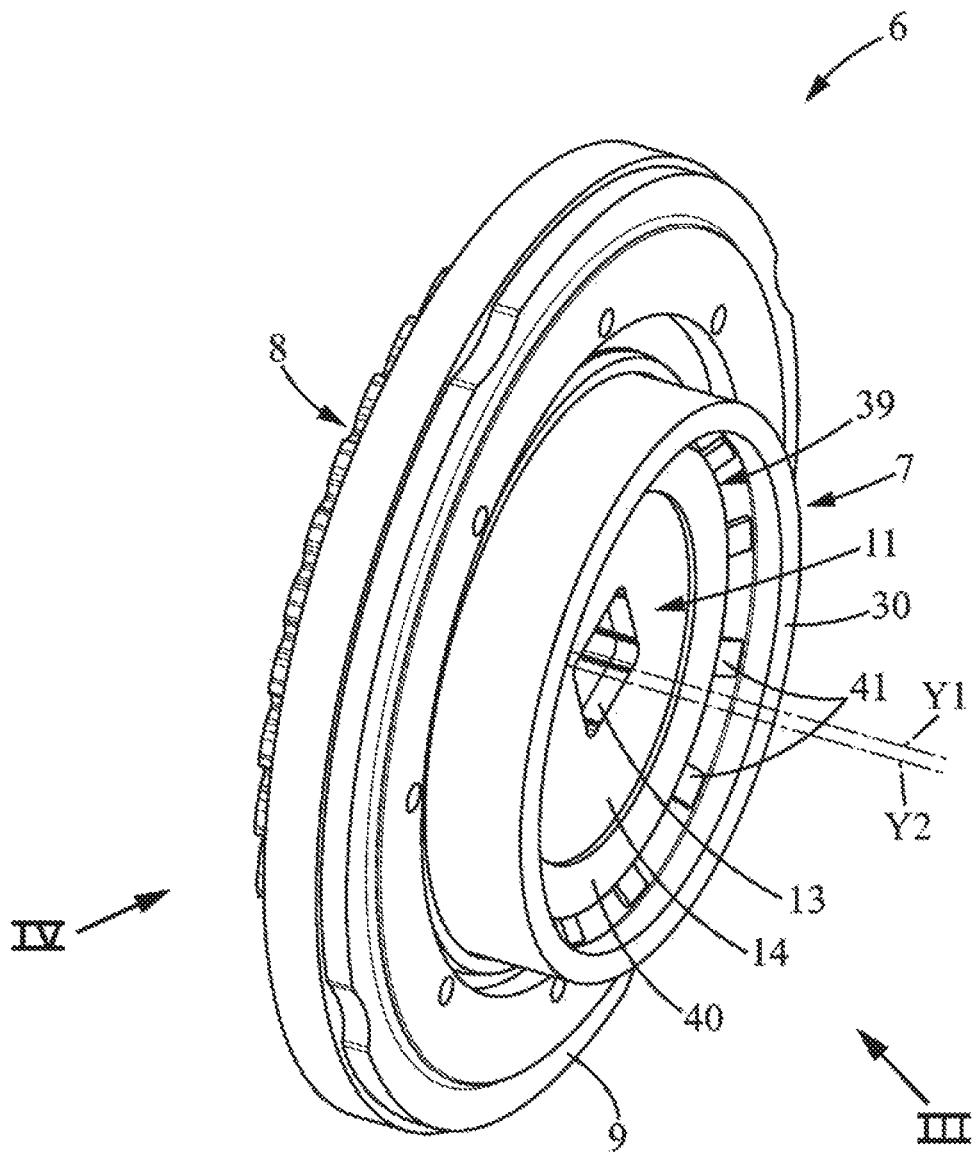
FIG. 2 is a perspective view of the articulation mechanism that can equip the seat from FIG. 1, in an embodiment of the invention.
Figure 3:
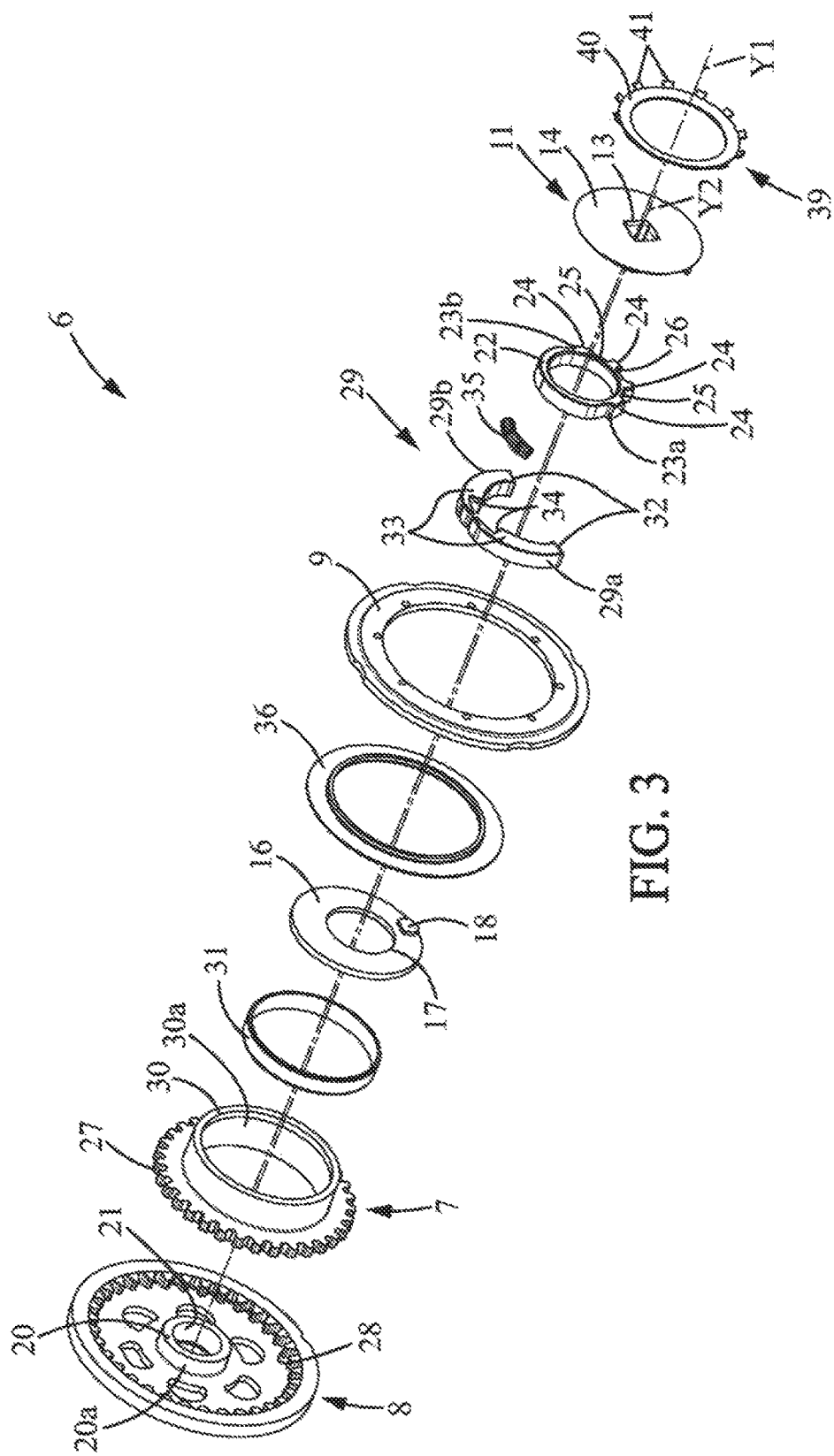
FIGS. 3 and 4 are blow-up views in perspective of the articulation mechanism from FIG. 2, viewed respectively along directions III and IV of FIG. 2.
Figure 4:
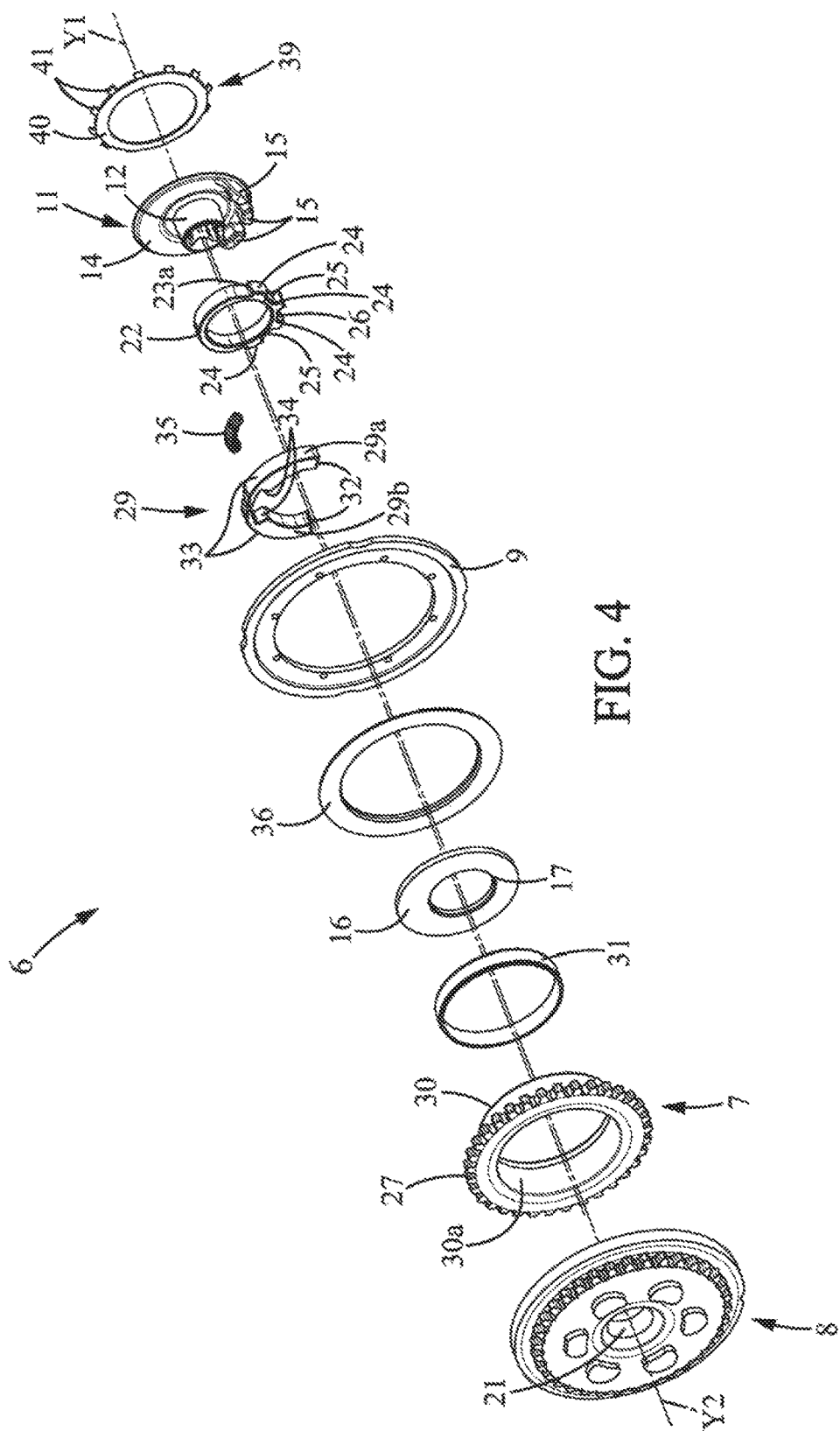

FIG. 1 represents a front seat 1 of an automobile, which has a seat back 2 mounted in a pivoting manner around an axis Y1 on a seat 3, which seat is itself mounted on the floor 4 of the vehicle, for example by tracks 5.

Thus, tilting of the seat 2 can be manually adjusted by means of a rotary control button 6a or similar which drives a geared articulation mechanism (thus a mechanism positively controlling the rotation of the back) 6, an embodiment of which is represented in FIGS. 2 to 6. In a variation, the driving of the mechanism 6 can be controlled by an electrical or other motor.

This articulation mechanism 6 has (see FIGS. 2 to 6):
  a first frame formed of a first metal disk-shaped shield 7 centered on axis Y1, which extends in a perpendicular plane to axis Y1 and which, in the example represented, may be for example integral with the frame of the seat 3 (particularly by a stay plate), a second frame formed of a second metal disk-shaped shield 8 centered on an axis Y2 parallel to Y1 but offset in relation to Y1, which extends parallel to the first shield 7, said second shield 8 being for example integral with the frame of back 2 (especially by welding or other means) and being retained against the first shield by any known means, for example by means of a metal ring 9 welded on the second frame 8 by including the first frame 7, (in a variation, ring 9 may be replaced by a ring crimped on the second frame 8 by including the first frame 7), a hypocycloidal gear 10 connecting together the first and second shields 7, 8 (see FIG. 5), and a control device having an input member 11 and an eccentric cam 22, 29, that controls the hypocycloidal gear 10.

The input member 11, visible in FIGS. 2 to 7, can for example be made in one piece by molding in a plastic material or in a light alloy. This input member 11 has a central shaft 12 that extends longitudinally according to the central axis Y2.

The central shaft 12 may possibly be pierced by a square (or fluted, or other) internal recess 13 in which the abovementioned control button 6*a* may engage.

In addition, central shaft 12 is radially extended outwards, at its end opposite from the second shield 8, by a flange 14 that extends parallel to shields 7, 8.

The inner face of flange 14 is extended towards the hypocycloidal gear 10, by at least one driving element 15, in this case three driving elements 15 that extend parallel to axis Y2 towards the second shield 8, and whose utility will be seen later.

The central shaft 12 presents a cylindrical shape of revolution centered on the axis Y2 and journaling in a bearing integral with the second shield 8 itself centered on axis Y2. Here this bearing is formed of a cylindrical through recess 21 arranged in the second shield 8 and in a collar 20 that is integral with this second shield. Collar 20 may be for example formed in a single piece with the second shield 8 and extends axially from the second shield 8 to the first shield 7.

Input member 11 is linked in rotation to eccentric cam 22-29, which in the example under consideration extends perpendicularly to axis Y1 and is driven by input member 11, this cam journaling around collar 20 in a cylindrical housing of revolution 30*a* integral with the first shield 7 and traversing said first shield 7, said housing 30*a* being centered on axis Y1. Cylindrical housing 30*a* is defined in particular by a metal collar 30 integral with the first shield 7.

Eccentric cam 22, 29 has a control ring 22 and a play adjustment assembly 29. Control ring 22 journals on the outer cylindrical surface 20*a* of the abovementioned collar 20 and is partially surrounded by the play adjustment assembly 29. Ring 22 is also eccentric in relation to the second axis Y2 in the example considered here, but said ring can be centered on this axis Y2.

Here the play adjustment assembly 29 has (see FIGS. 3 to 6) two metal, wedge-shaped cam parts 29*a*, 29*b* that are arranged opposite an external peripheral cylindrical surface of revolution of control ring 22.

Cam parts 29*a*, 29*b* each have a first end 32 of minimum radial thickness and a second end 33 of maximum radial thickness. The two ends 33 of the cam parts are adjacent and respectively comprise recesses 34 facing each other, which receive a spring 35 urging the cam parts towards a mutual spacing, i.e. towards a position of maximum eccentricity of cam 29.

Control ring 22 also has four external teeth 24, between the first ends 32 of the cam parts 29*a*, 29*b*. Between these teeth, three recesses are defined, two lateral recesses 25, and one central recess 26. Each of these recesses 25, 26 receives one of the fingers 15 of the input member 11, such that the control ring is integral in rotation with the input member 11.

The two teeth 24 that are closest to the cam parts also define shoulders 23*a*, 23*b* that are respectively facing the first ends 33 of cam parts 29*a*, 29*b*, a certain play being arranged at rest between each shoulder 23*a*, 23*b* and the first end 33 of the corresponding cam part 29*a*, 29*b*.

It will be noted that cam 22, 29 may possibly be replaced by a cam in two disk-shaped parts, known in itself.

Here the hypocycloidal gear 10 is a monorail gear that comprises, for example:

a first circular toothing 27 centered on the Y1 axis, this toothing being radially directed to the outside and formed on the inner face of the first shield 7, in a single piece with the shield, a second circular toothing 28 that is formed on the inner face of the second shield 8 and that is radially directed to the inside, this second toothing being centered on the Y2 axis, said second toothing 28 presenting an inner diameter greater than the outer diameter of the first toothing 27.

A bearing ring 31 can, if appropriate, be inserted between the eccentric cam 22, 29 and housing 30*a*, this ring being force-fitted in housing 30*a*.

Mechanism 6 also has a flat load-spreading washer 16, made in a rigid and compression-resistant material, such as steel. This load-spreading washer 16 presents a circular periphery centered on the Y1 axis and has a central circular recess 17 centered on the Y2 axis, which is fitted in collar 20 of the second frame 8. The load-spreading washer 16 substantially journals firmly on the outer surface 20*a* of collar 20 and is disposed with play j inside collar 30 of the first frame 7. The load-spreading washer 16 is axially inserted between the second frame 8 and the cam 29. It may also have a pin 18 projecting towards the first frame 7 and fitted into central recess 26 of control ring 22, facing one of the fingers 15 of the input member 11, such that said washer is integral in rotation with the input member.

More specifically, the load-spreading washer 16 is disposed radially in relation to the second axis Y2, which is mounted in a rotatable manner on the second frame 8 around the second axis Y2 and which is disposed in the cylindrical housing 30*a* of the first frame with play j, the outer periphery of the load-spreading washer being circular and centered on the first axis Y1, and the load-spreading washer 16 being rotated by the control device 11, 22 so as to substantially correspond to cam 29.

The play j is generally less than 1 mm when the first and second cam parts (29*a*, 29*b*) are in a position of maximum eccentricity. Advantageously, play j is sufficient for the load-spreading washer 16 to not interfere with the cylindrical housing 30*a* of the first frame in normal operation, when the first and second cam parts 29*a*, 29*b* are in a position of minimum eccentricity, i.e., during activation of the articulation mechanism 6. The play j may typically be between 0.2 and 0.6 mm and the thickness of the load-spreading washer 16 may typically be between 1 and 5 mm, for example on the order of 2 mm.

The articulation mechanism 6 may also have a metal closing ring 40 that maintains the core of the mechanism in the collar 30; This closing ring 40 is fixed in the cylindrical housing 30*a*, against the input member 11, by any known means and particularly by force-fitting, for example thanks to peripheral lugs 41 force-fitted in collar 30. These peripheral teeth 41 here projecting towards the outside are abutments bearing elastically on the inner surface of the collar, said teeth (41) slantedly extending radially outwards opposite to the second frame 8.

In addition, the articulation mechanism 6 may also comprise a sliding ring 36 axially inserted between the first and second frames.

The device which has just been described operates as follows.

When a user activates the input member 11 by means of the abovementioned button 6*a*, for example in a first angular direction 38, shoulder 23*a* of the control ring 22 abuts against the first end 33 of the cam part 29*a* and leads it in the first angular direction 38 by compressing the spring 35 of cam 29, which reduces the eccentricity of said cam 29. In the rest of the movement, the second cam part 29*a* then drives the cam part 29*b* in the first angular direction 38 (through spring 35 and/or by pressing between the second ends 33 of the cam parts), such that the eccentric cam 29 turns in the first direction 38 in the bearing ring 31, which makes the first axis Y1 turn around the second axis Y2 in the first angular direction 38. The result is a rotation of the first toothing 27 in the second toothing 28, corresponding for example to a forward pivot of the back 2.

The operation is the same, mutatis mutandis, when the input member 11 is activated in a second angular direction 39 opposite to the first angular direction.

When the seat back undergoes a very high torque, particularly in the event of an accident of the vehicle in which seat 1 is mounted, toothings 27, 29 tend to drive and thereby displace the first frame radially towards the inside, reducing the eccentricity between the axes Y1, Y2 under the effect of deformation of materials. The result is that the play j is reduced at the second ends 33 of the cam parts 29*a*, 29*b*, such that the load-spreading washer 16 is radially compressed between collars 20, 30, and thus participates in the load spreading, to delay breaking the articulation mechanism as long as possible. The maximum torque withstandable by the articulation mechanism may thus increase for example by approximately 10%, for example going from 2000 Nm without the washer 16 to 2200 Nm with the washer 16.

It should be noted that the addition of the load-spreading washer 16 only requires a little adjustment of the articulation mechanism 16, and particularly that the small added thickness that it represents does not interfere with the existing closing of the mechanism by the closing ring 40.

The invention claimed is:

1. An articulation mechanism comprising:
   first and second frames mounted in a rotatable manner with respect to one another and connected together by a gear that has:
   a first circular toothing directed outwards, centered on a first axis and integral with the first frame, and
   a second circular toothing directed inwards, centered on a second axis parallel to the first axis and offset in relation to said first axis, said second toothing presenting an inner diameter greater than an outer diameter of the first toothing,
   the first frame having a cylindrical housing of revolution centered on the first axis;
   a control device with an eccentric cam and radial play adjustment, mounted in a rotatable manner around the second axis in the cylindrical housing of the first frame; and
   a rigid load-spreading washer disposed radially in relation to the second axis, which is mounted in a rotatable manner on the second frame around the second axis, said load-spreading washer having a circular outer periphery which is centered on the first axis and which is disposed in the cylindrical housing of the first frame with play, and the load-spreading washer being rotated by the control device,
   wherein the load-spreading washer is axially inserted between the eccentric cam and the second frame.

2. The articulation mechanism according to claim 1, in which the eccentric cam of the control device has first and second cam parts, mobile with respect to one another in rotation around the first axis between a position of minimum eccentricity and a position of maximum eccentricity designed to take up play between the first and second toothings, said cam parts being elastically urged with respect to one another towards said position of maximum eccentricity.

3. The articulation mechanism according to claim 1, in which the second frame has a cylindrical collar of revolution centered on the second axis, said collar extending at least partially inside the cylindrical housing, and the load-spreading washer journals on said collar of the second frame.

4. The articulation mechanism according to claim 2, in which the play is less than 1 mm when the first and second cam parts are in the position of maximum eccentricity.

5. The articulation mechanism according to claim 2, in which the play is sufficient so that the load-spreading washer does not interfere with the cylindrical housing of the first frame in normal operation, when the first and second cam parts are in the position of minimum eccentricity.

6. The articulation mechanism according to claim 1, in which the load-spreading washer is made of steel.

7. The articulation mechanism according to claim 1, in which the load-spreading washer has a pin projecting towards the first frame that is engaged in a recess belonging to the control device, such that the control device rotates the load-spreading washer.

8. The articulation mechanism according to claim 1, also comprising a locking ring fixed in the cylindrical housing of the first frame and retaining the control device and the load-spreading washer in said housing.

9. A vehicle seat having first and second parts connected together by the articulation mechanism according to claim 1, the first and second frames being fixed, one to the first part and the other to the second part.

10. An articulation mechanism comprising:
    first and second frames mounted in a rotatable manner with respect to one another and connected together by a gear that has:
    a first circular toothing directed outwards, centered on a first axis and integral with the first frame, and
    a second circular toothing directed inwards, centered on a second axis parallel to the first axis and offset in relation to said first axis, said second toothing presenting an inner diameter greater than an outer diameter of the first toothing,
    the first frame having a cylindrical housing of revolution centered on the first axis;
    a control device with an eccentric cam and radial play adjustment, mounted in a rotatable manner around the second axis in the cylindrical housing of the first frame; and
    a rigid load-spreading washer disposed radially in relation to the second axis, which is mounted in a rotatable manner on the second frame around the second axis, said load-spreading washer having a circular outer periphery which is centered on the first axis and which is disposed in the cylindrical housing of the first frame with play, and the load-spreading washer being rotated by the control device,
wherein the second frame has a cylindrical collar of revolution centered on the second axis, said collar extending at least partially inside the cylindrical housing, and the load-spreading washer journals on said collar of the second frame.

11. The articulation mechanism according to claim 10, in which the eccentric cam of the control device has first and second cam parts, mobile with respect to one another in rotation around the first axis between a position of minimum eccentricity and a position of maximum eccentricity designed to take up play between the first and second toothings, said cam parts being elastically urged with respect to one another towards said position of maximum eccentricity.

12. The articulation mechanism according to claim 11, in which the play is less than 1 mm when the first and second cam parts are in the position of maximum eccentricity.

13. The articulation mechanism according to claim 11, in which the play is sufficient so that the load-spreading washer does not interfere with the cylindrical housing of the first frame in normal operation, when the first and second cam parts are in the position of minimum eccentricity.

14. The articulation mechanism according to claim 10, in which the load-spreading washer is made of steel.

15. The articulation mechanism according to claim 10, in which the load-spreading washer has a pin projecting towards the first frame that is engaged in a recess belonging to the control device, such that the control device rotates the load-spreading washer.

16. The articulation mechanism according to claim 10, also comprising a locking ring fixed in the cylindrical housing of the first frame and retaining the control device and the load-spreading washer in said housing.

17. A vehicle seat having first and second parts connected together by the articulation mechanism according to claim 10, the first and second frames being fixed, one to the first part and the other to the second part.

* * * * *